United States Patent
Bragg et al.

(10) Patent No.: US 7,165,488 B2
(45) Date of Patent: Jan. 23, 2007

(54) BREW CHAMBER FOR A SINGLE SERVE BEVERAGE BREWER

(75) Inventors: Tim A. Bragg, Malden, MA (US); C. Anthony Lai, Burlington, MA (US)

(73) Assignee: Keurig, Incorporated, Wakefield, MA (US)

(*) Notice: Subject to any disclaimer, the term of this patent is extended or adjusted under 35 U.S.C. 154(b) by 273 days.

(21) Appl. No.: 10/734,649

(22) Filed: Dec. 12, 2003

(65) Prior Publication Data

US 2005/0126399 A1    Jun. 16, 2005

(51) Int. Cl.
*A47J 31/00* (2006.01)

(52) U.S. Cl. .................... 99/295; 99/289 R; 99/302 R; 426/433

(58) Field of Classification Search ................. 99/295, 99/289 R, 302 R
See application file for complete search history.

(56) References Cited

U.S. PATENT DOCUMENTS

| | | | |
|---|---|---|---|
| 3,007,392 A * | 11/1961 | Pecoraro et al. ............... 99/307 |
| 4,581,239 A | 4/1986 | Woolman et al. |
| 4,644,855 A | 2/1987 | Woolman et al. |
| 4,738,378 A | 4/1988 | Oakley et al. |
| 5,272,960 A | 12/1993 | Kinna |
| 5,649,472 A | 7/1997 | Fond et al. |
| 5,794,519 A * | 8/1998 | Fischer .......................... 99/295 |
| 6,009,792 A | 1/2000 | Kraan |
| 6,047,630 A | 4/2000 | Brown et al. |
| 6,050,175 A | 4/2000 | Mirand et al. |
| 6,490,966 B2 | 12/2002 | Mariller et al. |
| 6,584,888 B2 | 7/2003 | Cortese |
| 6,655,260 B2 * | 12/2003 | Lazaris et al. ................. 99/295 |
| 6,698,332 B2 | 3/2004 | Kollep et al. |
| 6,725,762 B2 | 4/2004 | Kollep et al. |
| 6,748,850 B1 | 6/2004 | Kraan |
| 6,763,759 B2 | 7/2004 | Denisart |
| 6,799,503 B2 | 10/2004 | Kollep et al. |
| 6,857,352 B2 | 2/2005 | Fischer |
| 6,857,353 B2 * | 2/2005 | Kollep et al. ............. 99/289 R |
| 6,904,840 B1 | 6/2005 | Pfeifer et al. |
| 2002/0002913 A1 | 1/2002 | Mariller et al. |
| 2002/0124736 A1 | 9/2002 | Kollep et al. |
| 2004/0031394 A1 | 2/2004 | Yoakim et al. |
| 2004/0182248 A1 | 9/2004 | Fischer |

(Continued)

FOREIGN PATENT DOCUMENTS

EP    0151252    8/1985

(Continued)

*Primary Examiner*—Reginald L. Alexander
(74) *Attorney, Agent, or Firm*—Wolf, Greenfield & Sacks, P.C.

(57) ABSTRACT

A brew chamber for a single serve filter package. The chamber includes a receptacle having an open top, configured and dimensioned to receive the package. A frame for supporting the receptacle for pivotal movement about a first axis between a vertical brew position and a forwardly inclined open position. A lid is supported on the frame for pivotal movement about a second axis between a raised position allowing access to the open top when the receptacle is in the open position, and a lowered position closing the open top when the receptacle is in the brew position. The receptacle is linked to the lid such that the receptacle is pivoted between the brew and open positions in response to movement of the lid between the lowered and raised positions.

33 Claims, 8 Drawing Sheets

U.S. PATENT DOCUMENTS

2005/0106288 A1 5/2005 Blanc et al.
2005/0132891 A1 6/2005 Chen et al.
2005/0235834 A1 10/2005 Blanc et al.

FOREIGN PATENT DOCUMENTS

| EP | 0870457 A1 | 10/1998 |
| WO | WO-94/02059 | 2/1994 |
| WO | WO-98/20782 | 5/1998 |
| WO | WO-01/30218 A1 | 5/2001 |

* cited by examiner

BREW CHAMBER FOR A SINGLE SERVE BEVERAGE BREWER

BACKGROUND OF THE INVENTION

1. Field of the Invention

This invention relates generally to single serve beverage brewers, and is concerned in particular with the provision of a novel and improved brew chamber for such brewers.

2. Description of the Prior Art

In known brew chambers for single serve beverage brewers, such as those disclosed for example in U.S. Pat. Nos. 5,325,765; 6,079,315; 6,142,063; and 6,606,938, a disposable beverage filter cartridge is pierced by inlet and outlet probes to accommodate a through flow of metered hot water. The hot water infuses a dry beverage medium contained in the cartridge to thereby produce a single serving of the beverage.

The brew chambers are opened and closed by automatically operable mechanisms that have proven to be reliable, although relatively complex and expensive.

Other beverage brewers of the type disclosed for example in WO 02/43541 A1 have brew chambers that are opened and closed manually, but these also employ unduly complicated operating mechanisms.

Moreover, the prior art brew chambers, be they automatically or manually operated, suffer from an added disadvantage in that their cartridge or pod receptacles remain vertical and thus inconveniently oriented when the chambers are opened.

There exists a need, therefore, for an improved beverage chamber that has a relatively simple and inexpensive operating mechanism, with the capability of presenting the cartridge receptacle in a forwardly inclined position, thus enhancing its accessibility during both insertion of fresh cartridges and retrieval of spent cartridges.

SUMMARY OF THE INVENTION

A brew chamber in accordance with the present invention has a receptacle with an open top configured and dimensioned to receive a beverage filter cartridge. A fixed frame supports the receptacle for pivotal movement about a first axis between a vertical brew position and a forwardly inclined open position. A lid is supported on the frame for pivotal movement about a second axis between a raised position allowing access to the forwardly inclined open receptacle, and a lowered position closing the receptacle in its vertical brew position. The first and second axes are parallel. A linkage connects the receptacle to the lid and serves to pivotally manipulate the receptacle between its open and brew positions in response to movement of the lid between its raised and lowered positions.

These and other features and advantages of the present invention will now be described in greater detail with reference to the accompanying drawings, wherein:

DETAILED DESCRIPTION OF PREFERRED EMBODIMENTS

With reference initially to FIGS. 1–4, a single serve beverage brewer is shown at 10 having a housing 12 with a forwardly protruding shelf 14 arranged to support a cup 16 for the brewed beverage.

The housing 12 contains components conventionally included in brewers of this type, including, inter alia, a water tank, heater, pump, electronic controls, etc. These are well known to those skilled in the art, and thus have not been illustrated, nor will they be described further in this specification. Suffice it to say that these components coact in response to the user's command to deliver a metered amount of heated water to a brew chamber generally indicated at 18.

The brew chamber includes a cartridge receptacle 20 and a lid 22. The receptacle has an open top configured and dimensioned to receive a beverage filter cartridge 24 (see FIGS. 3 and 4). The cartridge 24 is preferably of the type disclosed, for example, in U.S. Pat. No. 5,840,189, the description of which is herein incorporated by reference. Cartridge 24 includes an impermeable piercable container internally subdivided by a filter element into two compartments, one of which contains a dry beverage medium. Alternatively, the brew chamber could be employed to process beverage pods that typically are structured with soluble beverage materials confined between top and bottom filter media.

With reference additionally to FIGS. 5–8, the brew chamber 18 includes a frame structure 26 secured in any known manner within the brewer housing 12.

Figure 1:
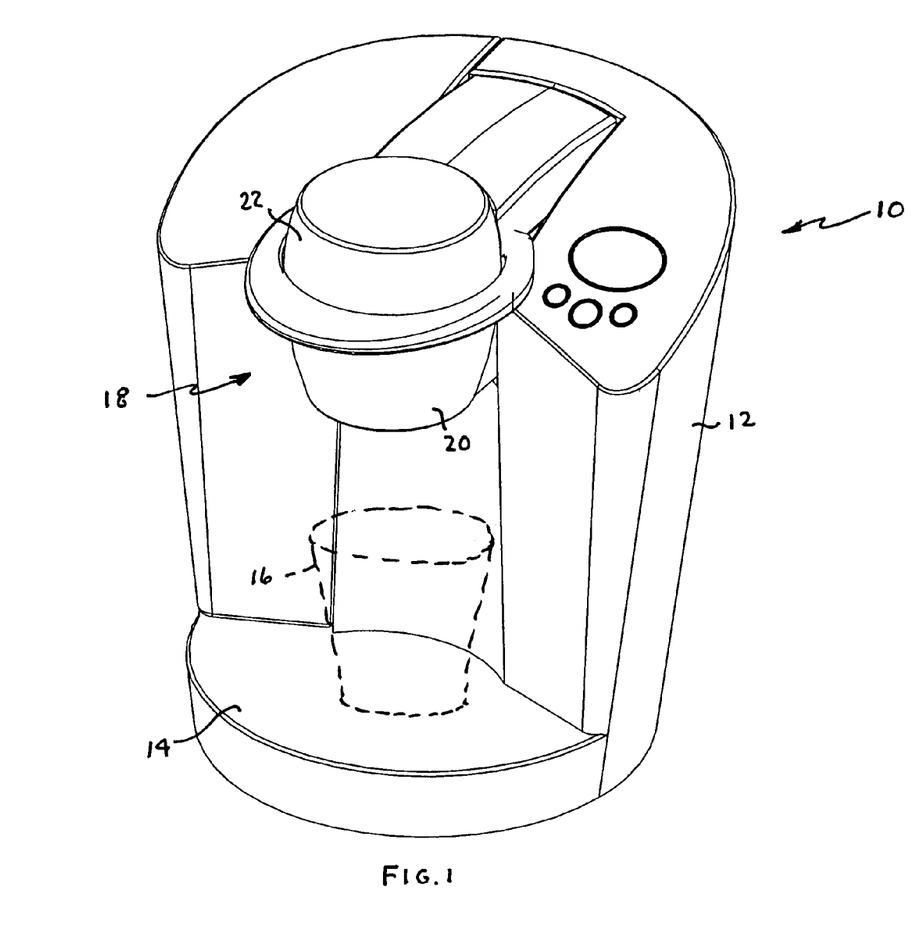
FIG. 1 is a front perspective view of a single serve beverage brewer, with a brew chamber in accordance with the present invention shown in its closed condition.
Figure 2:
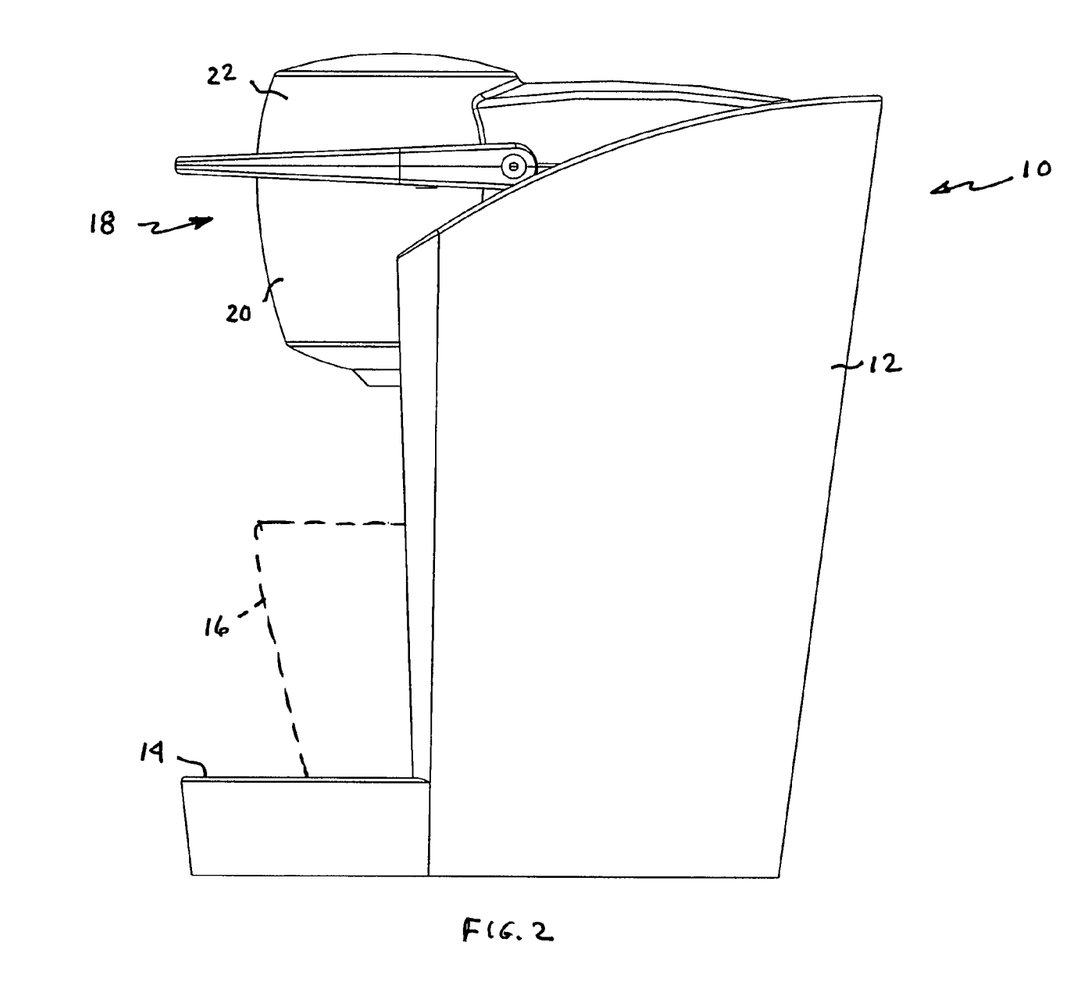
FIG. 2 is a side elevational view of the brewer as shown in FIG. 1.
Figure 3:
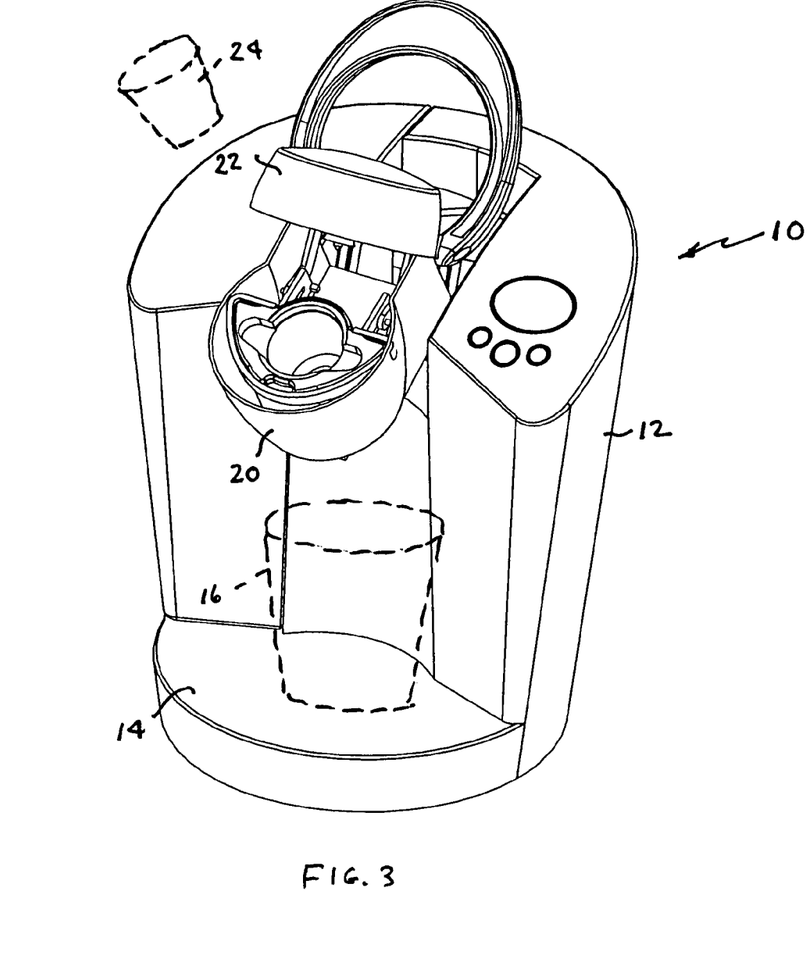
FIG. 3 is a view similar to FIG. 1 showing the brew chamber in its open condition.
Figure 4:
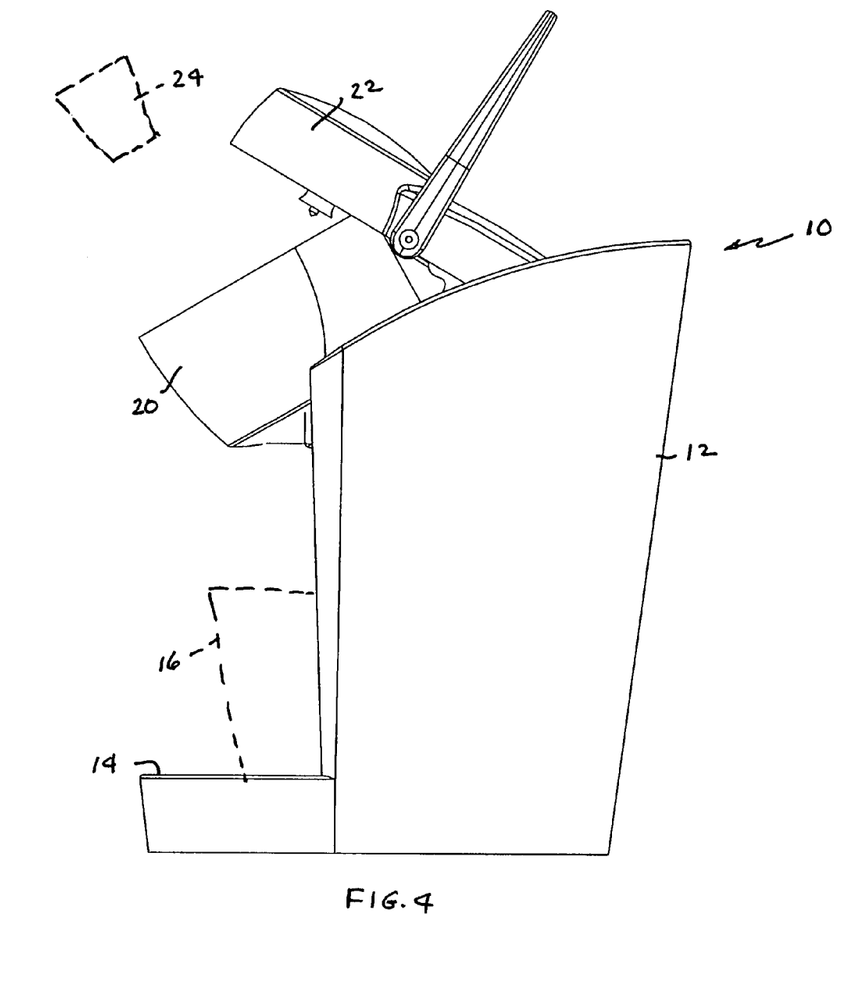
FIG. 4 is a side elevational view of the brewer as shown in FIG. 3.
Figure 5:
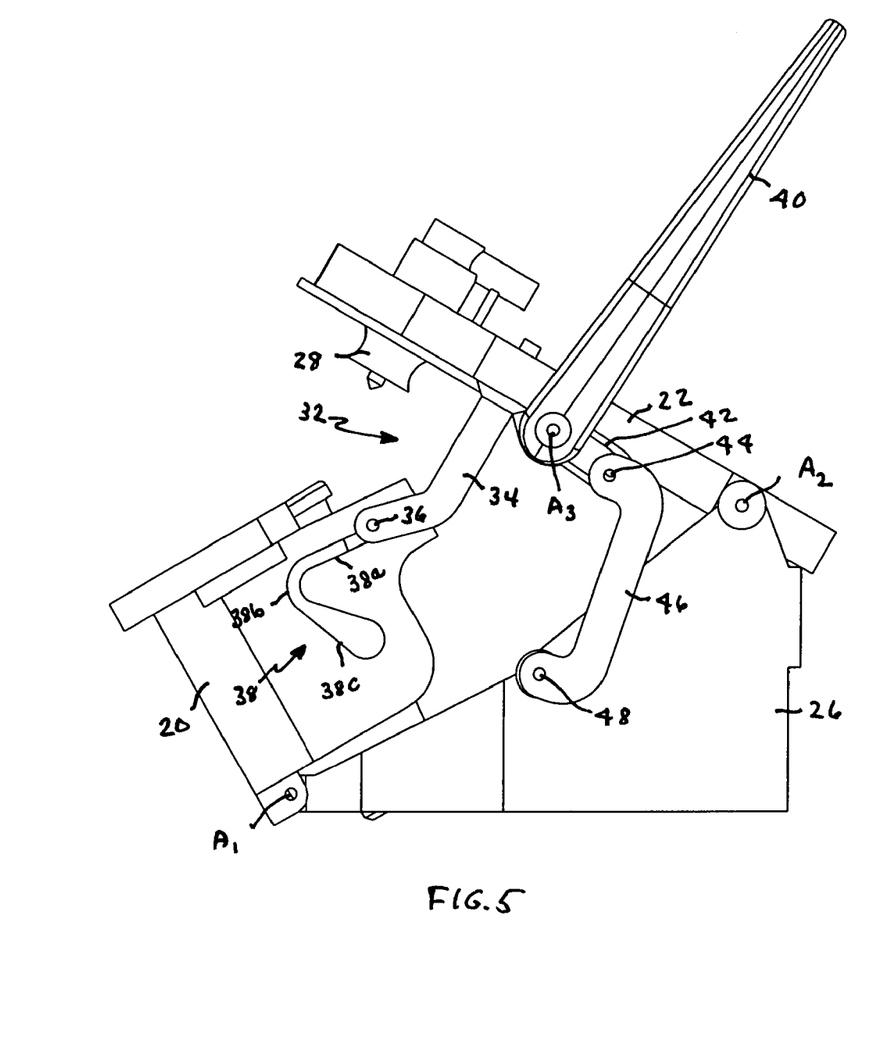
FIG. 5 is a side view of the brew chamber and its operating mechanism removed from the brewer housing, the chamber being shown open.

The receptacle 20 is supported by the frame structure for pivotal movement about a first axis $A_1$ between a vertical brew position, as shown in FIGS. 1, 2, 7 and 8, and a forwardly inclined open position, as shown in FIGS. 3, 4 and 5.

Figure 6:
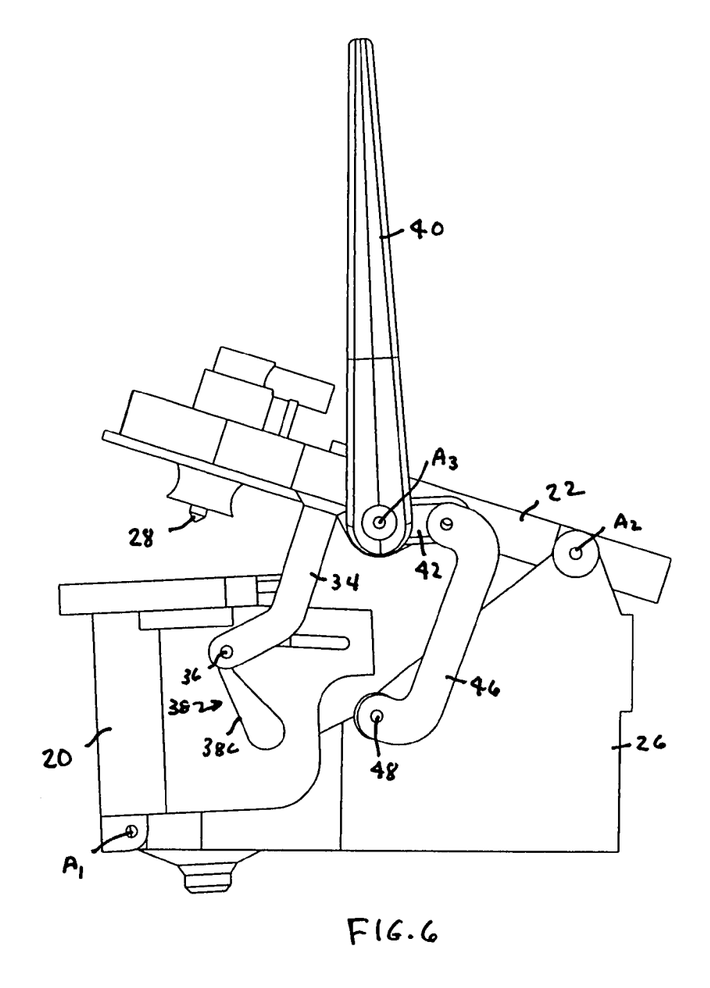
FIG. 6 is a view similar to FIG. 5 showing the brew chamber in the process of being closed.
Figure 7:
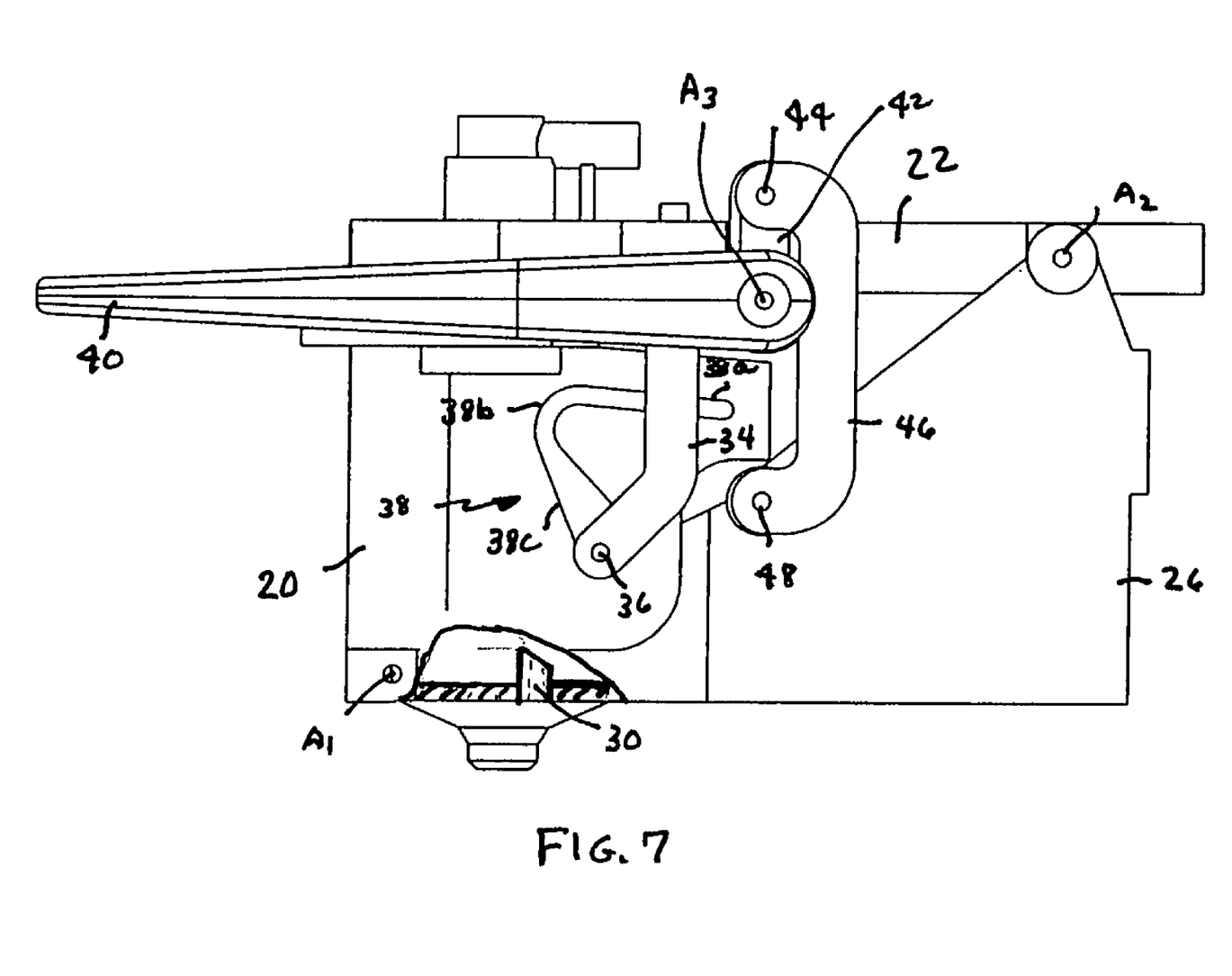
FIG. 7 is a view similar to FIGS. 5 and 6 showing the brew chamber closed.
Figure 8:
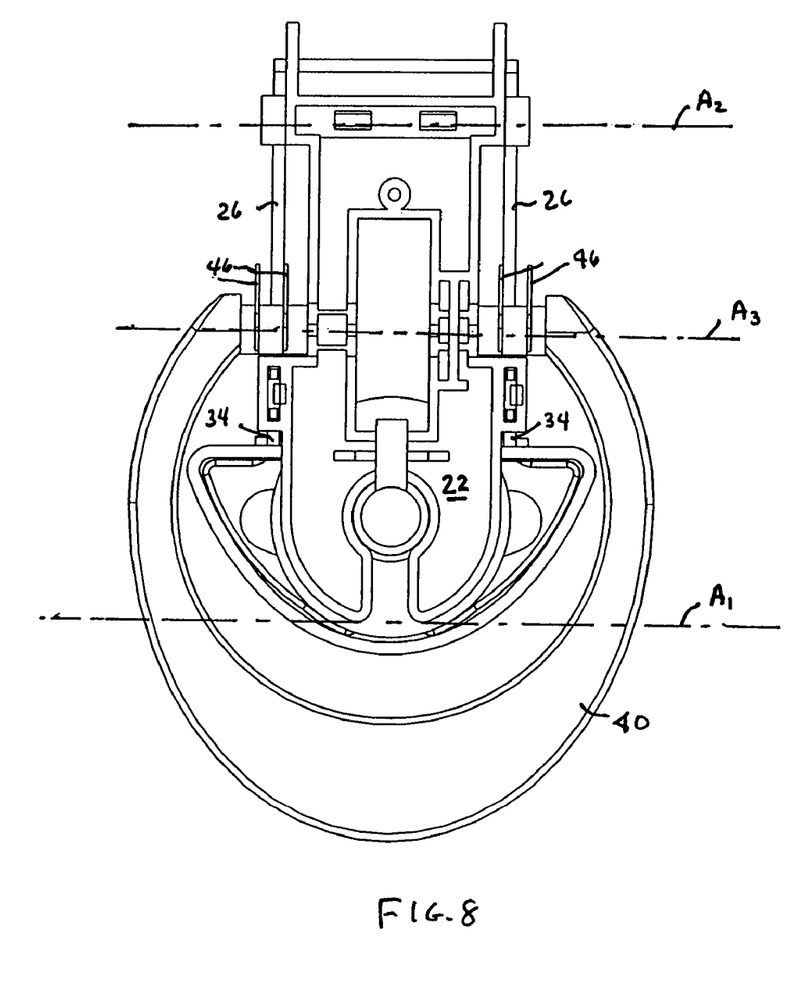
FIG. 8 is a top plan view of the closed brew chamber.

The lid 22 is supported by the frame structure 26 for pivotal movement about a second axis $A_2$ between a lowered closed position, again as shown in FIGS. 1, 2, 7 and 8, and a raised open position as shown in FIGS. 3, 4 and 5. The raised lid allows access to the forwardly inclined receptacle for convenient insertion and removal of a beverage filter cartridge 24. The lowered lid closes and cooperates with the receptacle to enclose a filter cartridge during the brew cycle. As shown in FIG. 6, the lid carries an inlet probe 28 and as shown in FIG. 7, the base of the receptacle includes an outlet probe 30. The probes pierce the cartridge as the lid is lowered to its closed position, thus accommodating a through flow of heated water into the cartridge via the inlet probe for infusion with the beverage medium contained in the cartridge, with the resulting brewed beverage exiting via the outlet probe for delivery to the underlying cup 16. As mentioned previously, a beverage pod could be employed alternatively, with water flowing into the brew chamber via an inlet port or ports rather than an inlet probe, with the brewed beverage exiting the brew chamber via an outlet port or ports.

As can be seen in FIGS. 5–8, a linkage generally indicated at 32 connects the receptacle 20 to the lid 22 and serves to pivot the former between its vertical brew and forwardly inclined positions in response to movement of the latter between its lowered and raised positions. The linkage includes arms 34 secured at their upper ends to the lid 22, and carrying pins 36 at their lower ends. The pins 36 are positioned to ride in contoured slots 38 in opposite sides of the receptacle 20. The slots 38 have upper horizontal segments 38a communicating at bends 38b with rearwardly inclined and somewhat enlarge lower segments 38c.

A generally U-shaped operating handle 40 has its ends connected to the lid 22 for pivotal movement about a third axis $A_3$ parallel to the first and second axes $A_1$, $A_2$. The handle 40 carries connecting arms 42 pivotally connected as at 44 to links 46 which in turn are pivotally connected as at 48 to the frame structure 26.

When the receptacle 20 is in its forwardly inclined open position as shown in FIG. 5, the operating handle 40 is at an angle of approximately 90° with respect to the lid 22, and the pins 36 on arms 34 are at the rearmost ends of the horizontal slot segments 38a.

As the arm 40 is pivoted forwardly about axis $A_3$ (FIG. 6), the pins 36 on arms 34 progress around the slot bends 38b, pivotally urging the receptacle about axis $A_1$ rearwardly from its forwardly inclined position. Simultaneously, the cooperative pivotal action of the arms 42 and links 46 causes the lid 22 to be pivotally lowered about axis $A_2$.

At the closed position shown in FIG. 7, the pins 36 on arms 34 have reached the lower ends of the slots 38, and the operating arm 40 is substantially parallel to the fully lowered lid 22.

In light of the foregoing, it will now be understood that the mechanism of the present invention is relatively simple, involving as major components the receptacle 20, lid 22 and handle 40 respectively mounted for pivotal movement about parallel axes $A_1$, $A_2$ and $A_3$. The brew chamber 18 can accommodate various types of disposable filter packages, including the filter cartridge 24 shown in the drawings, as well as filter pods. When the brew chamber is opened, the receptacle is inclined forwardly to facilitate insertion of fresh filter packages and removal of spent filter packages.

We claim:

1. An apparatus for forming a beverage, comprising:
   a housing adapted to support components of a beverage forming device;
   a receptacle, having an opening to receive a beverage cartridge, movable relative to the housing between a vertical position and a stationary, inclined position in which the receptacle is arranged to receive and hold a beverage cartridge; and
   a lid movable relative to the housing between open and closed positions, the lid in the closed position cooperating with the receptacle in the vertical position to facilitate formation of a beverage when liquid is provided to the cartridge;
   wherein in the inclined position, the receptacle opening faces in a direction away from the lid, and the receptacle opening has a center axis extending from a center of the opening, and when the receptacle is in the vertical position, the center axis extends vertically and intersects the lid, and when the receptacle is in the stationary, inclined position, the center axis does not intersect the lid.

2. The apparatus of claim 1, wherein the receptacle is pivotable about a first axis relative to the housing.

3. The apparatus of claim 1, wherein the lid is pivotable about a second axis relative to the housing.

4. The apparatus of claim 1, wherein the receptacle is pivotable about a first axis relative to the housing, and the lid is pivotable about a second axis relative to the housing.

5. The apparatus of claim 4, wherein the first and second axes are parallel.

6. The apparatus of claim 1, further comprising a handle that is manually movable to cause the receptacle to move between the vertical and inclined positions and the lid to move between the closed and open positions, respectively.

7. The apparatus of claim 1, further comprising a linkage that causes movement of the receptacle in response to movement of the lid.

8. The apparatus of claim 7, wherein the linkage includes at least one pin attached to the lid that engages with a slot formed in the receptacle.

9. The apparatus of claim 1, further comprising a linkage and a handle coupled to the linkage, wherein movement of the handle causes the linkage to move the lid.

10. The apparatus of claim 9, wherein the linkage includes at least one arm pivotally connected to the lid and at least one link pivotally connected to the at least one arm and to the housing.

11. The apparatus of claim 10, wherein the handle is coupled to the at least one arm such that movement of the handle causes rotation of the at least one arm.

12. The apparatus of claim 11, wherein rotation of the at least one arm causes the lid to move between the open and closed positions.

13. The apparatus of claim 12, wherein the linkage further includes at least one pin attached to the lid that engages with a slot formed in the receptacle and wherein movement of the lid causes the receptacle to move between the vertical and inclined positions.

14. The apparatus of claim 1, further comprising an inlet probe that is arranged to pierce a beverage cartridge in the receptacle when the lid is moved to the closed position.

15. The apparatus of claim 14, wherein the receptacle is arranged to receive a filter pod.

16. The apparatus of claim 14, further comprising an outlet probe arranged to pierce a beverage cartridge in the receptacle to allow a beverage to exit the cartridge.

17. The apparatus of claim 1, further comprising a beverage cartridge that includes a beverage medium and a filter element.

18. The apparatus of claim 1, wherein the lid and receptacle move simultaneously in at least part of their respective movement between the open and closed positions, and the vertical and inclined positions.

19. The apparatus of claim 1, constructed and arranged to produce a brewed beverage.

20. The apparatus of claim 1, further comprising a water tank, a heater to heat water and a pump to provide heated water to the beverage cartridge.

21. The apparatus of claim 1, wherein the inclined position in which the receptacle is arranged to receive and hold a beverage cartridge is a forwardly inclined position.

22. A method for forming a beverage, comprising:
   providing a beverage forming device having a housing with a receptacle accessible to a user, the receptacle having an opening to receive a beverage cartridge, and the receptacle opening having a center axis extending from a center of the opening;

moving the receptacle from a vertical position, in which the center axis extends vertically and intersects a lid in a closed position, to a forwardly inclined position in which the opening of the receptacle to receive a cartridge faces away from the lid, and the center axis does not intersect the lid in an open position;

moving the lid to the open position;

providing a beverage cartridge in the receptacle while the receptacle is in the forwardly inclined position;

moving the receptacle to the vertical position;

moving the lid to the closed position in which the lid cooperates with the receptacle to at least partially enclose the beverage cartridge; and providing a liquid into the beverage cartridge to produce a beverage.

23. The method of claim 22, wherein:

the step of moving the receptacle from a vertical position to a forwardly inclined position comprises moving a handle from a closed position to an open position.

24. The method of claim 22, wherein:

the steps of moving the receptacle from a vertical position to a forwardly inclined position and moving the lid to the open position comprises moving a handle from a closed position to an open position.

25. The method of claim 22, wherein:

the step of moving the receptacle from a vertical position to a forwardly inclined position comprises pivoting the receptacle about a first axis.

26. The method of claim 25, wherein:

the step of moving the lid to the open position comprises pivoting the lid about a second axis relative to the housing.

27. The method of claim 22, wherein a linkage causes movement of the receptacle in response to movement of the lid.

28. The method of claim 27, wherein the step of moving the lid to the open position comprises moving at least one pin attached to the lid relative to a slot formed in the receptacle.

29. The method of claim 22, further comprising piercing the beverage cartridge with an inlet probe when the lid is moved to the closed position.

30. The method of claim 22, wherein the beverage cartridge includes a beverage medium and a filter element.

31. The method of claim 22, wherein the beverage is a brewed beverage.

32. An apparatus for forming a beverage, comprising:

a housing adapted to support components of a beverage forming device;

a receptacle rotatable relative to the housing about a first axis between a vertical position and an inclined position in which the receptacle is accessible to insert or remove a beverage cartridge; and a lid rotatable relative to the housing about a second axis between open and closed positions with the position of the second axis remaining stationary relative to the housing, the lid in the closed position cooperating with the receptacle in the vertical position to facilitate formation of a beverage when liquid is provided to the cartridge, the receptacle being rotatable about the first axis in a first direction toward the inclined position, and the lid being rotatable about the second axis in a second direction, different from the first direction, toward the open position.

33. The apparatus of claim 32, wherein the first axis is parallel to the second axis.

* * * * *